United States Patent
Leblanc et al.

(10) Patent No.: US 7,147,426 B2
(45) Date of Patent: Dec. 12, 2006

(54) SHOCKWAVE-INDUCED BOUNDARY LAYER BLEED

(75) Inventors: André Denis Leblanc, St. Bruno (CA); Gilbert Ouellet, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 145 days.

(21) Appl. No.: 10/840,291

(22) Filed: May 7, 2004

(65) Prior Publication Data

US 2005/0249578 A1   Nov. 10, 2005

(51) Int. Cl.
*F01D 17/00* (2006.01)

(52) U.S. Cl. .................. 415/1; 415/57.1; 415/57.4; 415/58.5; 415/144; 415/181; 415/914; 60/782; 60/785

(58) Field of Classification Search .......... 415/1, 415/57.1, 57.4, 58.4, 58.5, 58.7, 144–145, 415/181, 914; 60/782, 785
See application file for complete search history.

(56) References Cited

U.S. PATENT DOCUMENTS

| | | | |
|---|---|---|---|
| 2,720,356 A * | 10/1955 | Erwin | ........ 415/144 |
| 3,993,414 A | 11/1976 | Meauze et al. | |
| 4,000,869 A | 1/1977 | Wong et al. | |
| 4,012,165 A * | 3/1977 | Kraig | ........ 415/145 |
| 4,123,196 A | 10/1978 | Prince, Jr. et al. | |
| 4,156,344 A | 5/1979 | Cuthbertson et al. | |
| 4,463,552 A | 8/1984 | Monhardt et al. | |
| 4,708,584 A | 11/1987 | Meng | |
| 4,743,161 A | 5/1988 | Fisher et al. | |
| 4,930,978 A | 6/1990 | Khanna et al. | |
| 4,930,979 A | 6/1990 | Fisher et al. | |
| 4,981,018 A | 1/1991 | Jones et al. | |
| 5,059,093 A | 10/1991 | Khalid et al. | |
| 5,186,601 A | 2/1993 | Treece et al. | |
| 5,256,031 A * | 10/1993 | Bothien et al. | ........ 415/1 |
| 5,261,228 A | 11/1993 | Shuba | |
| 5,275,528 A | 1/1994 | Freeman et al. | |
| 5,279,109 A | 1/1994 | Liu et al. | |
| 5,308,225 A * | 5/1994 | Koff et al. | ........ 415/57.4 |
| 5,642,985 A * | 7/1997 | Spear et al. | ........ 415/181 |
| 6,164,911 A * | 12/2000 | LeBlanc et al. | ........ 416/181 |
| 6,183,195 B1 | 2/2001 | Tremaine | |
| 6,428,271 B1 | 8/2002 | Ress, Jr. et al. | |
| 6,574,965 B1 | 6/2003 | Feulner | |
| 6,585,479 B1 * | 7/2003 | Torrance | ........ 415/58.5 |

FOREIGN PATENT DOCUMENTS

| | | |
|---|---|---|
| CA | 2199875 | 4/1996 |
| GB | 2407142 | 11/2003 |

* cited by examiner

*Primary Examiner*—Christopher Verdier
(74) *Attorney, Agent, or Firm*—Ogilvy Renault LLP

(57) ABSTRACT

An apparatus and method is provided for improving efficiency of a transonic gas turbine engine compressor by bleeding off a shockwave-induced boundary layer from the gas flow passage of the compressor using an array of bleed holes having a downstream edge aligned with a foot of an oblique shock wave which originates on the leading edge of an adjacent transonic rotor blade tip.

18 Claims, 3 Drawing Sheets

SHOCKWAVE-INDUCED BOUNDARY LAYER BLEED

TECHNICAL FIELD

The present invention relates generally to gas turbine engines, and more particularly to an improved compressor therefor.

BACKGROUND OF THE INVENTION

Bleeding air from gas turbine engine compressors is well known. Air bled from the compressor can sometimes be used to provide a source of pressurized and/or cool air to the engine or the aircraft, however air is principally bled from the compressor in order to improve the operating envelope and overall compressor efficiency, which is often expressed as improved surge margin. Increased incidence angle between the airflow and the blade leading edges at "off design" conditions tends to cause separation of the flow on the suction side of the blades, which results in blade stall and eventually complete surging of the compressor. By bleeding off this stalled airflow adjacent the blade tips, the surge margin of the compressor is thus increased. This accordingly improves the overall efficiency of the compressor.

However, separation of airflow on the compressor blades can also result from factors other than increased blade leading edge incidence. Particularly, the interaction between the boundary layer formed on a stationary outer shroud and a shock wave produced by supersonic compressor blade tips rotating within the shroud, also tends to cause additional flow separation which can result in blade stall and to full compressor surge. Although the inlet flow may be subsonic in a subsonic compressor, the flow relative to the rotor blade tips of a high speed compressor can nevertheless become supersonic, causing separation-inducing shock waves at the blade tips.

Accordingly, there is a need to provide an improved compressor which addresses these and other limitations of the prior art, and it is therefore an object of this invention to do so.

SUMMARY OF THE INVENTION

It is an aim of the present invention to provide a gas turbine engine compressor having improved efficiency.

In accordance with a first aspect of the present invention, there is provided a transonic gas turbine engine compressor comprising: a rotor having a central axis of rotation and a plurality of blades extending into a gas flow passage through said compressor, each of said blades having a blade tip and a leading edge defined between opposed pressure and suction surfaces, said rotor being rotatable about said axis of rotation at a speed such that gas flow adjacent said blade tips becomes supersonic, creating oblique shock waves originating at said leading edge and terminating at a shock foot on said suction surface of an adjacent blade; an outer shroud surrounding said rotor, said outer shroud defining a radially outer boundary of said gas flow passage; a plurality of bleed holes extending through at least a portion of said outer shroud adjacent said blade tips to provide gas flow communication between said gas flow passage and an outer bleed passage, said plurality of bleed holes defining a bleed hole array; and said bleed hole array defining a downstream edge thereof substantially aligned in a gas flow direction with said shock foot and extending upstream thereof, said bleed holes in said array being selected in size, number and location to bleed at least a portion of a shockwave-induced boundary layer from said gas flow passage adjacent said outer shroud.

There is also provided, in accordance with a second aspect of the present invention, a method of bleeding a shockwave-induced boundary layer from a transonic gas turbine engine compressor comprising: providing a rotor having a plurality of blades extending into a gas flow passage of the compressor and an outer shroud surrounding said rotor; rotating said rotor such that gas flow adjacent tips of said blades becomes supersonic, creating an oblique shockwave originating at a leading edge of each said tip and terminating at a shock foot on a suction surface of an adjacent blade; providing a plurality of bleed holes in said outer shroud in a predetermined region corresponding to a boundary layer induced by said oblique shock wave; and bleeding said shockwave-induced boundary layer out of said gas flow passage.

Further details of these and other aspects of the present invention will be apparent from the detailed description and Figures included below.

BRIEF DESCRIPTION OF THE DRAWINGS

Reference is now made to the accompanying Figures depicting aspects of the present invention, in which.

DETAILED DESCRIPTION OF THE PREFERRED EMBODIMENT

Figure 1:
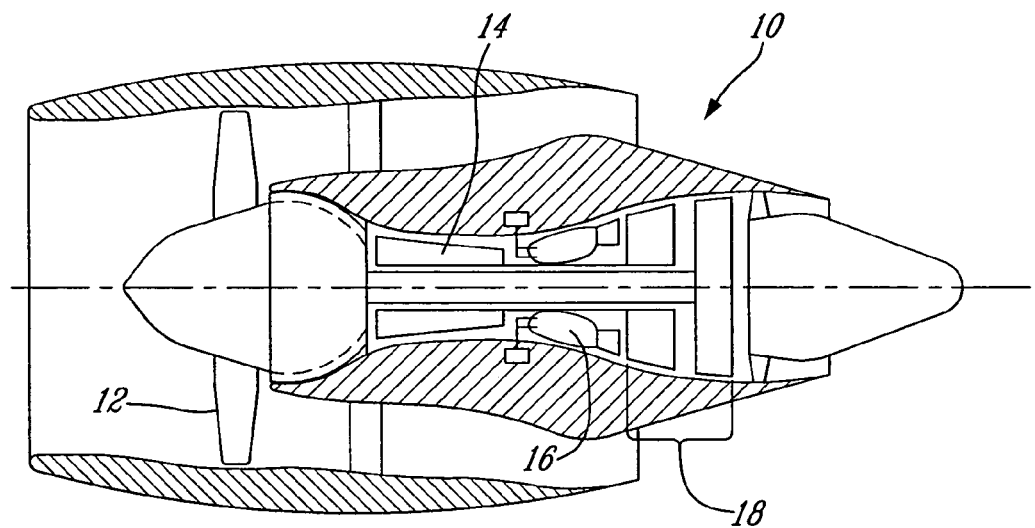
FIG. 1 is a partially-sectioned side view schematic of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor section 14 is typically a multi-stage compressor, and thus may comprise several axial and/or centrifugal compressors. Although the present invention is preferably adapted for use with an axial turbomachine rotor, and will therefore be described below with regards to its use in an axial compressor, it is to be understood that the use of the present invention in a centrifugal compressor and/or a mixed flow rotor is also envisaged. The present invention is also intended for transonic compressor rotors rather than fully supersonic ones. The term transonic rotor, as used herein, is defined as a rotor having generally subsonic inlet flow, but wherein a relative Mach number of the flow near at least a portion of blade tip region is supersonic.

Figure 2:
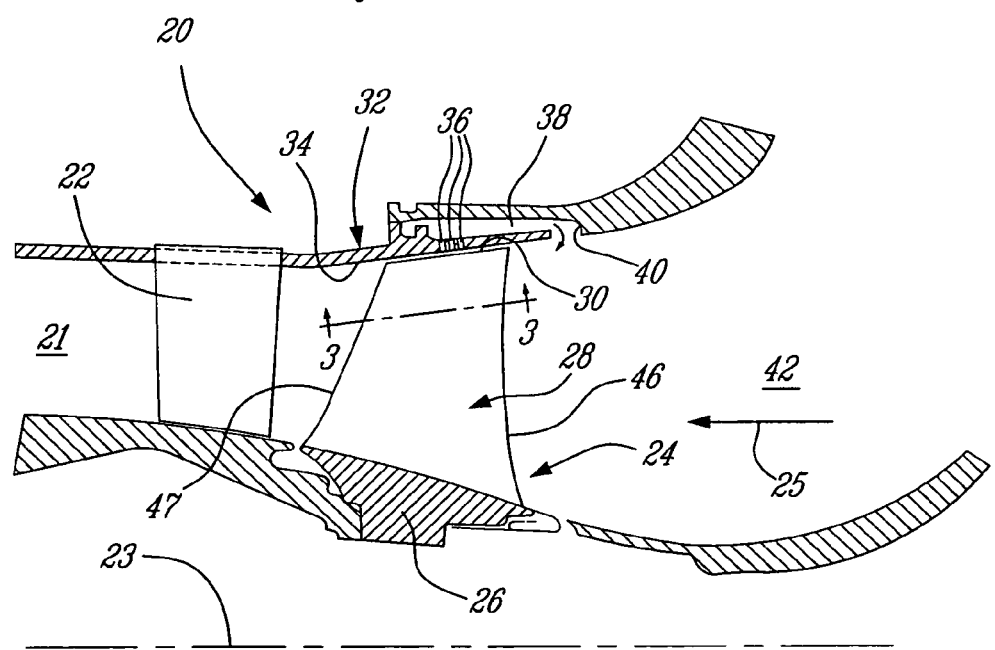
FIG. 2 is a partial cross-section of one embodiment of a compressor in accordance with the present invention.
Figure 3:
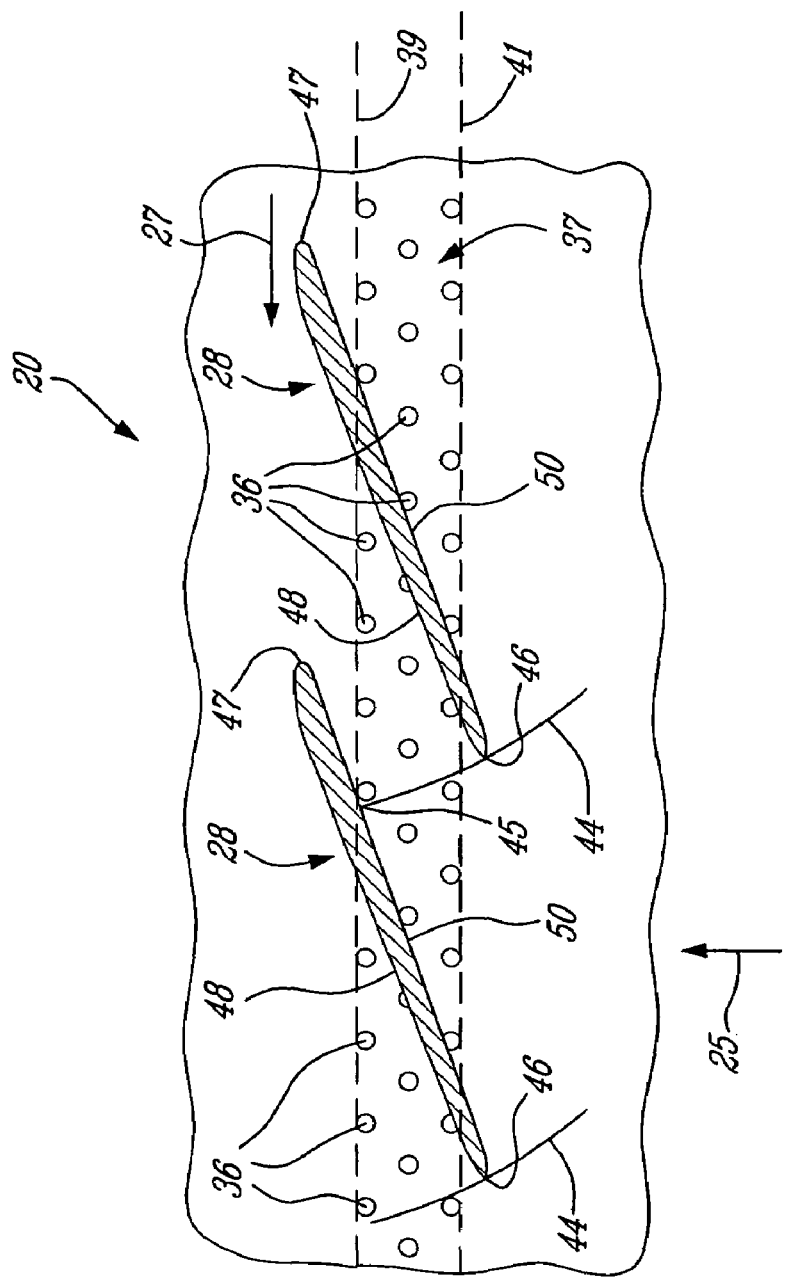
FIG. 3 is a cross-sectional view taken through line 3—3 of FIG. 2.

Referring to FIGS. 2 and 3, an axial compressor 20 of the compressor section 14 comprises generally a rotor 24 and a stator 22 downstream relative thereto, each having a plurality of blades defined within the gas flow path downstream of the compressor inlet passage 42 and upstream of the compressor discharge passage 21. The gas flowing in direction 25 is accordingly fed to the compressor 20 via the compressor inlet passage 42 and exits therefrom via the compressor discharge passage 21. The rotor 24 rotates about a central axis of rotation 23 within the stationary and circumferentially extending outer shroud 32, which defines a radial outer boundary of the annular gas flow path through the compressor 20. The rotation of the rotor 24 is shown in FIG. 3 by displacement of the blades 28 in direction 27 relative to the airflow direction 25. The rotor 24 includes a central hub 26 and a plurality of blades 28 radially extending therefrom and terminating in blade tips 30 immediately adjacent the outer shroud 32. Each blade 28 includes a leading edge 46 defined between a pressure surface 48 and a suction surface 50, as best seen in FIG. 3.

The stationary outer shroud 32 defines a plurality of bleed holes 36 in a portion thereof immediately adjacent the blade tips 30 of the rotor 24. The bleed holes 36 provide fluid flow communication between the annular main compressor gas path, defined radially within the outer shroud 32, and a bleed passage 38 disposed radially outward from the shroud 32. The bleed passage 38 is preferably disposed adjacent to the rotor 24, and may define an annular cavity which receives the bleed air. Thus, to bleed holes 36 passively bleed air from the compressor 20, more specifically the bleed holes 36 bleed shock-wave induced airflow separation therefrom, as will be described in greater detail below. The air bled via the bleed holes 36 into the bleed passage 38 is subsequently re-introduced back into the main gas path of the compressor, preferably into the compressor inlet passage 42 through at least one bleed exhaust opening 40 located just upstream of the rotor 24. As air is passively bled by the bleed holes 36, there is accordingly a continuous bleed of air from the main gas path of the compressor. Such a passive bleed design allows for self regulation of the bleed flow based on flow conditions and shock properties of the assembly. As these can be predetermined by one skilled in the art, the necessary amount of bleed flow can be established and regulated to bleed off substantially only shockwave-induced boundary layer from the gas path of the transonic compressor rotor. Generally, only a very small amount of bleed flow is required to achieve this, much less than many compressor bleed systems. At least less than 5% of to total flow through the compressor is bled off by bleed holes 36, but more preferably only about 1% of the total flow through the compressor is bled off by the bleed holes 36. This is accordingly significantly less than traditional compressor bleed systems which bleed off separated flow in a conventional subsonic compressor, in which typically between 5% and 25% of the total flow is bled off. Air bled by bleed holes 36 is also dumped back into the main gas flow, preferably upstream from the rotor 28, and therefore no further uses for the small amount of air bleed from the compressor are intended. In contrast, prior art compressor bleed designs often route bled air to other parts of to turbomachine for alternate uses, such as cooling airflow and the like. Such designs are significantly more complex, and therefore heavy and expensive, and require a considerably greater volume of bleed airflow to supply such alternate uses adequately.

Referring now to FIG. 3 in greater detail, the plurality of bleed holes 36 are arranged in a predetermined region of the shroud 32 relative to the rotor blades 28, such that the bleed holes 36 provide passive bleeding of a shockwave-induced boundary layer from the gas path flow adjacent the outer shroud 32. As noted above, even when compressor inlet flow is subsonic, the flow near the rotor blade tips 30 of the high speed compressor 20 can nevertheless become supersonic, causing oblique shock waves to form at the leading edges 46 of the blade tips 30. Generally, oblique shock waves 44 are formed at the leading edge 46 of a first blade tip and terminate with a shock foot 45 on the suction surface 50 of an adjacent blade tip. One skilled in flat art will appreciate that the design of the compressor rotor 24 is such that the shocks formed at the transonic blade tips 30 are oblique shocks rather than normal shocks, to prevent significant loss of compressor efficiency.

However, such oblique shock waves 44 interact with the flow boundary layer, which forms on the inner surface 34 of the stationary outer shroud 32, to cause an additional separation of flow induced by the shock-wave. The bleed holes 36 are therefore positioned such that this shockwave-induced flow separation is passively bled out of the compressor gas flow path, thereby at least reducing and delaying blade stall. This accordingly provides an improved surge margin, and therefore an improved overall efficiency, for such a transonic compressor. Additionally, by substantially eliminating, or at least significantly reducing, the growth of this shock-induced boundary layer, flow diffusion in the compressor gas path passage is enhanced and the flow separation at "off-design" conditions is thus delayed. Although work is done by the compressor on the air which is then bled off, the overall effect on the net efficiency loss of the compressor section will be minimal, due to the counteracting efficiency improvement for downstream compressor blade rows which is a result of bleeding off the flow separation caused by the interaction between the oblique shock waves and the boundary layer at an upstream blade row. In fact, the net compressor stage efficiency can actually improve, while the surge margin gain provided is nevertheless maintained. Conversely, a more loaded blade passage can be permitted with similar surge margins.

As shown in FIG. 3, the bleed holes 36 are defined in the outer shroud 32 in an array 37 of a plurality of holes, the array being preferably provided about the full circumference of the outer shroud 32. The bleed hole array 37 is located, relative to a fluid flow direction 25, between the leading edges 46 and tailing edges 47 of the rotor blades 28. The array 37 of bleed holes 36 preferably includes at least several rows of holes deep in an axial direction parallel to the flow direction 25, and defines a band about the outer shroud 32.

More specifically, the array 37 of bleed holes 36 is positioned in the outer shroud 32 such that a downstream edge 39 of the array of holes is aligned, in a fluid flow direction 25. with each oblique shock wave foot 45 on the blade suction surfaces 50 An upstream edge 41 of the array 37 of bleed holes 36 is preferably disposed just downstream from the leading edges 46 of the blades 28. As such, the array 37 of bleed holes 36 is disposed within a shock-induced boundary layer region, axially defined between the leading edges 46 of the blade tips 30 and the location of the oblique shock foots 45 on the blade suction surfaces 50. As noted above, the number and size of the bleed holes 36 are preferably defined such that approximately 1% of the total main flow through the compressor is bled off. In a particular embodiment the array 37 defines at least three rows of bleed holes 36 between the downstream edge 39 and the upstream edge 41.

Figure 4:
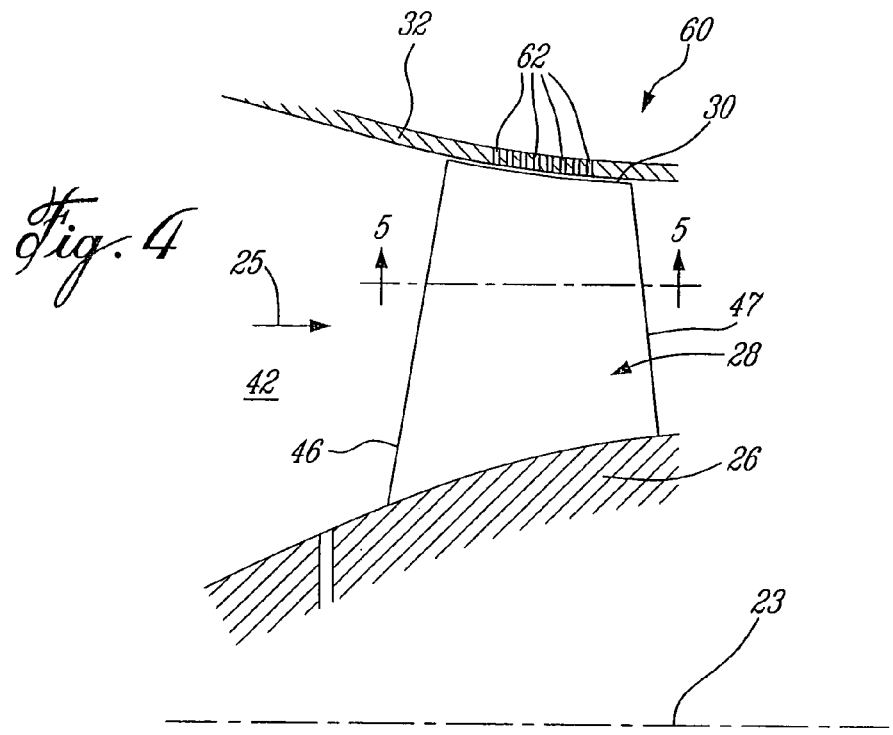
FIG. 4 is a partial cross-section of a compressor in accordance with an alternate embodiment of the present invention.
Figure 5:
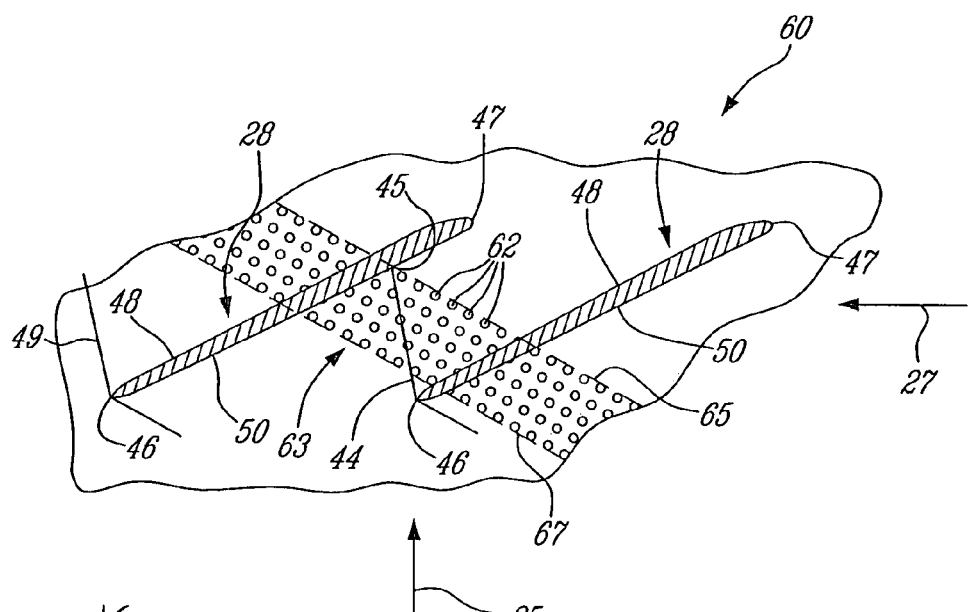
FIG. 5 is a cross-sectional view taken through line 5—5 of FIG. 4.

Referring now to FIGS. 4 and 5 which depict an alternate compressor 60 which is similar to the compressor 20 described above, but having an alternate bleed hole configuration. Particularly, a plurality of bleed holes 62 are provided in the outer shroud 32 in an array 63 which, as per the first embodiment described above, defines a downstream edge 65 which is approximately aligned, in a fluid flow direction 25, with the shock wave foots 45 on the blade suction surfaces

50. The upstream edge 67 of the array 63 of bleed holes 62 is also preferably disposed just downstream from the leading edges 46 of the blades 28.

As seen in FIG. 5, the array or band 63 between adjacent blades 28 is disposed at an angle relative to a plane perpendicular to the flow direction 25. In contrast, the array 37 of bleed holes depicted in FIG. 3 is oriented substantially parallel to such a plane perpendicular to the direction of fluid flow through the compressor. However, both arrays 37,63 of bleed holes are nevertheless positioned in the outer shroud such that their downstream edges 39,65 are substantially aligned, in a fluid flow direction 25, with the shock wave foots 45 on the blade suction surfaces 50.

Thus the bleed holes 36,62 are thus defined in a region of outer shroud 32 corresponding to the area in which an oblique shook forms when flow adjacent the blade tips becomes supersonic. Although the pressure downstream of the bleed holes and the particular pattern of the shock wave firmed will vary the specific hole geometry and position, one skilled in the art will appreciate that the location of the oblique shock foot on the blade suction surfaces may be determined. Therefore the arrays 37,63 of bleed holes 36,62 may be thus suitably positioned in a region of the outer shroud 32 which is defined at least upstream of the foot 45 of the oblique shook wave formed at each supersonic blade tips 30 of the transonic rotor.

The above description is meant to be exemplary only, and one skilled in the art will recognize that changes may be made to the embodiments described without departing from the scope of the invention disclosed. For example, as noted above, although the present invention is preferably adapted for use with an axial compressor, it may also be employed in a centrifugal compressor or a mixed flow rotor. Still other modifications which fall within the scope of the present invention will be apparent to those skilled in the art, in light of a review of this disclosure, and such modifications are intended to fall within the equivalents accorded to the appended claims.

The invention claimed is:

1. A transonic gas turbine engine compressor comprising:
   a rotor having a central axis of rotation and a plurality of blades extending into a gas flaw passage through said compressor, each of said blades having a blade tip and a leading edge defined between opposed pressure and suction surfaces, said rotor being rotatable about said axis of rotation at a speed such that gas flow adjacent said blade tips becomes supersonic, creating oblique shock waves originating at said leading edge and terminating at a shock foot on said suction surface of an adjacent blade;
   an outer shroud surrounding said rotor, said outer shroud defining a radially outer boundary of said gas flow passage;
   a plurality of bleed holes extending through at least a portion of said outer shroud adjacent said blade tips to provide gas flow communication between said gas flow passage and an outer bleed passage, said plurality of bleed holes defining a bleed bole array, and
   said bleed hole array defining a downstream edge thereof substantially aligned in a gas flow direction with said shock foot and extending upstream thereof, said bleed holes in said array being selected in size, number and location to bleed at least a portion of a shockwave-induced boundary layer from said gas flow passage adjacent said outer shroud.

2. The compressor as defined in claim 1, wherein said bleed hole array defines an upstream edge thereof substantially aligned with said leading edge of said blade on which said oblique shock originates.

3. The compressor as defined in claim 1, wherein said bleed hole array is disposed upstream of each said shock foot on said adjacent blade and downstream of said leading edge of said blade on which said oblique shock originates.

4. The compressor as defined in claim 1, wherein said compressor is an axial compressor.

5. The compressor as defined in claim 1, wherein said bleed hole array extends circumferentially about said outer shroud.

6. The compressor as defined in claim 5, wherein said bleed passage is an annular cavity surrounding said outer shroud.

7. The compressor as defined in claim 1, wherein said selection of bleed holes is such that less than 5% of total gas flow through said gas flow passage is bled off by said bleed hole array.

8. The compressor as defined in claim 7, wherein said bleed holes are arranged and sized such that about 1% of said total gas flow is bled off by said bleed holes.

9. The compressor as defined in claim 1, wherein said outer shroud defines a bleed exhaust opening therein, said bleed exhaust opening providing gas flow communication between said outer bleed passage and said gas flow passage such that gas flow, bled into said outer bleed passage via said plurality of bleed holes, is exhausted back into said gas flow passage.

10. The compressor as defined in claim 9, wherein said bleed exhaust opening is disposed upstream from said rotor.

11. The compressor as defined in claim 1, wherein said bleed hole array defines a band substantially parallel to a plane perpendicular to said gas flow direction.

12. The compressor as defined in claim 1, wherein said bleed hole array defines a band disposed at an angle relative to a plane perpendicular to said gas flow direction.

13. The compressor as defined in claim 1, wherein said bleed hole array defines at least three rows of said bleed holes between said downstream edge and an upstream edge of the bleed hole array.

14. A method of bleeding a shockwave-induced boundary layer from a transonic gas turbine engine compressor comprising:
   providing a rotor having a plurality of blades extending into a gas flow passage of the compressor and an outer shroud surrounding said rotor;
   rotating said rotor such that gas flow adjacent tips of said blades becomes supersonic, creating an oblique shockwave originating at a leading edge of each said tip and terminating at a shock foot on a suction surface of a respective adjacent blade;
   providing a plurality of bleed holes in said outer shroud in a predetermined region corresponding to a boundary layer induced by said oblique shock wave;
   arranging said plurality of bleed holes in a bleed hole array;
   positioning said bleed hole array such that a downstream edge thereof is substantially aligned, in a gas flow direction within said gas flow passage, with said shock foot of each said oblique shockwave and bleeding said shockwave-induced boundary layer out of said gas flow passage.

15. The method as defined in claim 14, further comprising passively bleeding said shockwave-induced boundary layer.

16. The method as defined in claim 14, further comprising selecting a number and size of said bleed holes such that about 1% of total gas flow through said gas flow passage is bled off by said bleed holes.

17. The method as defined in claim 14, further comprising exhausting gas bled via said bleed holes back into said gas flow passage.

18. The method as defined in claim 17, wherein said gas is reintroduced into said gas flow passage upstream from said rotor.

* * * * *